US011818474B1

(12) United States Patent
Locher et al.

(10) Patent No.: US 11,818,474 B1
(45) Date of Patent: Nov. 14, 2023

(54) SPARSE RGB CAMERAS FOR IMAGE CAPTURE

(71) Applicant: Meta Platforms Technologies, LLC, Menlo Park, CA (US)

(72) Inventors: Alex Locher, Oberrohrdorf (CH); Naveen Makineni, Seattle, WA (US); Oskar Linde, San Carlos, CA (US); John Enders Robertson, Carlsbad, CA (US); Anthony Aslan Tenggoro, Sunnyvale, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/895,875

(22) Filed: Aug. 25, 2022

(51) Int. Cl.
*H04N 25/133* (2023.01)
*H04N 23/84* (2023.01)
*H04N 25/13* (2023.01)
*G06T 3/40* (2006.01)
G06T 19/00 (2011.01)
H04N 13/388 (2018.01)

(52) U.S. Cl.
CPC ......... *H04N 25/133* (2023.01); *G06T 3/4015* (2013.01); *H04N 23/843* (2023.01); *H04N 25/134* (2023.01); G06T 19/006 (2013.01); H04N 13/388 (2018.05)

(58) Field of Classification Search
CPC .. H04N 25/133; H04N 23/843; H04N 25/134; H04N 13/388; G06T 3/4015; G06T 19/006
See application file for complete search history.

(56) References Cited

U.S. PATENT DOCUMENTS

| | | | |
|---|---|---|---|
| 2018/0359432 A1* | 12/2018 | Horak | H04N 23/12 |
| 2019/0320105 A1* | 10/2019 | Tang | G06T 3/4015 |
| 2021/0255584 A1* | 8/2021 | Choi | H04N 23/843 |
| 2022/0336508 A1* | 10/2022 | Tang | H04N 25/534 |
| 2023/0046521 A1* | 2/2023 | Yang | H04N 25/50 |
| 2023/0138657 A1* | 5/2023 | Yang | H04N 25/133 348/222.1 |

* cited by examiner

*Primary Examiner* — Shahbaz Nazrul
(74) *Attorney, Agent, or Firm* — Baker Botts L.L.P.

(57) ABSTRACT

In one embodiment, a computing system may receive sensor data from an image sensor having a pixel array including color pixel sensors and panchromatic pixel sensors in a first pattern. Each of the color pixel sensors is associated with one of several color channels. The computing system may generate, based on the sensor data, a filtered monochrome image including monochrome values corresponding to the pixel array of the image sensor. The computing system may generate a filtered color image having a second pattern of color channels. A first pixel of a particular color channel at a first pixel location in the filtered color image is determined based on the monochrome value corresponding to the first pixel location in the filtered monochrome image, the sensor data measured by a color pixel sensor at a second pixel location, and the monochrome value at the second pixel location in the filtered monochrome image.

20 Claims, 13 Drawing Sheets

SPARSE RGB CAMERAS FOR IMAGE CAPTURE

TECHNICAL FIELD

This disclosure generally relates to computer graphics and image capture techniques.

BACKGROUND

Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Artificial reality may be associated with applications, products, accessories, services, or some combination thereof, that are, e.g., used to create content in artificial reality and/or used in (e.g., perform activities in) an artificial reality.

Artificial reality systems that provide artificial reality content may be implemented on various platforms, including a head-mounted device (HMD) connected to a host computer system, a standalone HMD, a mobile device or computing system, or any other hardware platform capable of providing artificial reality content to one or more viewers. When a user is wearing an HMD, his vision of the physical environment is occluded by the physical structure of the HMD. For example, the displays of the HMD could be positioned directly in front of and in close proximity to the user's eyes. Thus, whenever the user needs to see his physical surroundings, he would need to remove the HMD. Even if the removal of the HMD is temporary, doing so is inconvenient and disruptive to the user experience.

SUMMARY OF PARTICULAR EMBODIMENTS

"Passthrough" is a feature that allows a user wearing an HMD to see his physical surroundings by displaying visual information captured by the HMD's front-facing cameras. To account for misalignment between the stereo cameras and the user's eyes and to provide parallax, the passthrough images are re-rendered based on a 3D model representation of the physical surrounding. The 3D model provides the rendering system geometry information, and the images captured by the HMD's cameras are used as texture images.

In particular embodiments, a computing system may generate monochrome images and color images from an image sensor that has sparse RGB sensor pattern. Current designs of artificial reality (e.g., AR/VR) devices may include image sensors (e.g., cameras) with only monochrome pixel sensors to enable features such as, headset tracking, depth detection, monochrome passthrough, and the like. However, to improve upon the user experience, a user may desire color passthrough to enable the user to see images that more closely resemble the real world. The cost of replacing current image sensors that have monochrome pixel sensors with color pixel sensors may be cost-prohibitive. Current algorithms may also rely on certain inputs, such as data received from monochrome pixel sensors. Additionally, the quantum efficiency of the color pixel sensors may be less than panchromatic pixel sensors that are similar to monochrome pixel sensors. As a result, to enable color passthrough and maintain a certain threshold of quantum efficiency an image sensor may implement a filter including a sparse RGB pattern that may be implemented within global shutter sensors. The sparse RGB pattern may enable color information extraction from the global shutter cameras.

In particular embodiments, the sparse RGB pattern may be designed into global shutter sensors. The sparse RGB pattern may be de-mosaiced in an image signal processor (ISP) of a computing system and the color information can be fed into a monochrome image to provide a color passthrough experience to the user. To do so, a sparse RGB CFA pattern may be used for an image sensor. In particular embodiments, the RGGB pattern implemented may account for a certain percentage (e.g., 25%) of the total pixel array and the rest of the can be panchromatic pixels. When generating the color image, one or more of the median value or mean values of surrounding pixel sensors may be used to color a pixel sensor. The gradient in brightness change may be used to determine a direction of which mean to use. As an example and not by way of limitation, if the color changes less frequently along a direction for instance a striped shirt, then the mean of that particular direction may be used to ensure a more accurate color reading. The ISP may use a particular algorithm to determine color values to apply to surrounding pixels of a color pixel sensor. In particular embodiments, the ISP may determine a delta value to carry over to the surrounding panchromatic pixel sensors by subtracting an interpolated white pixel from a filtered monochrome image to extract the color information to be added to a target interpolated white pixel. This process may be carried over to interpolate color information to the panchromatic pixel sensors. The result may be used for color passthrough to improve upon the user experience.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system, and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1A:
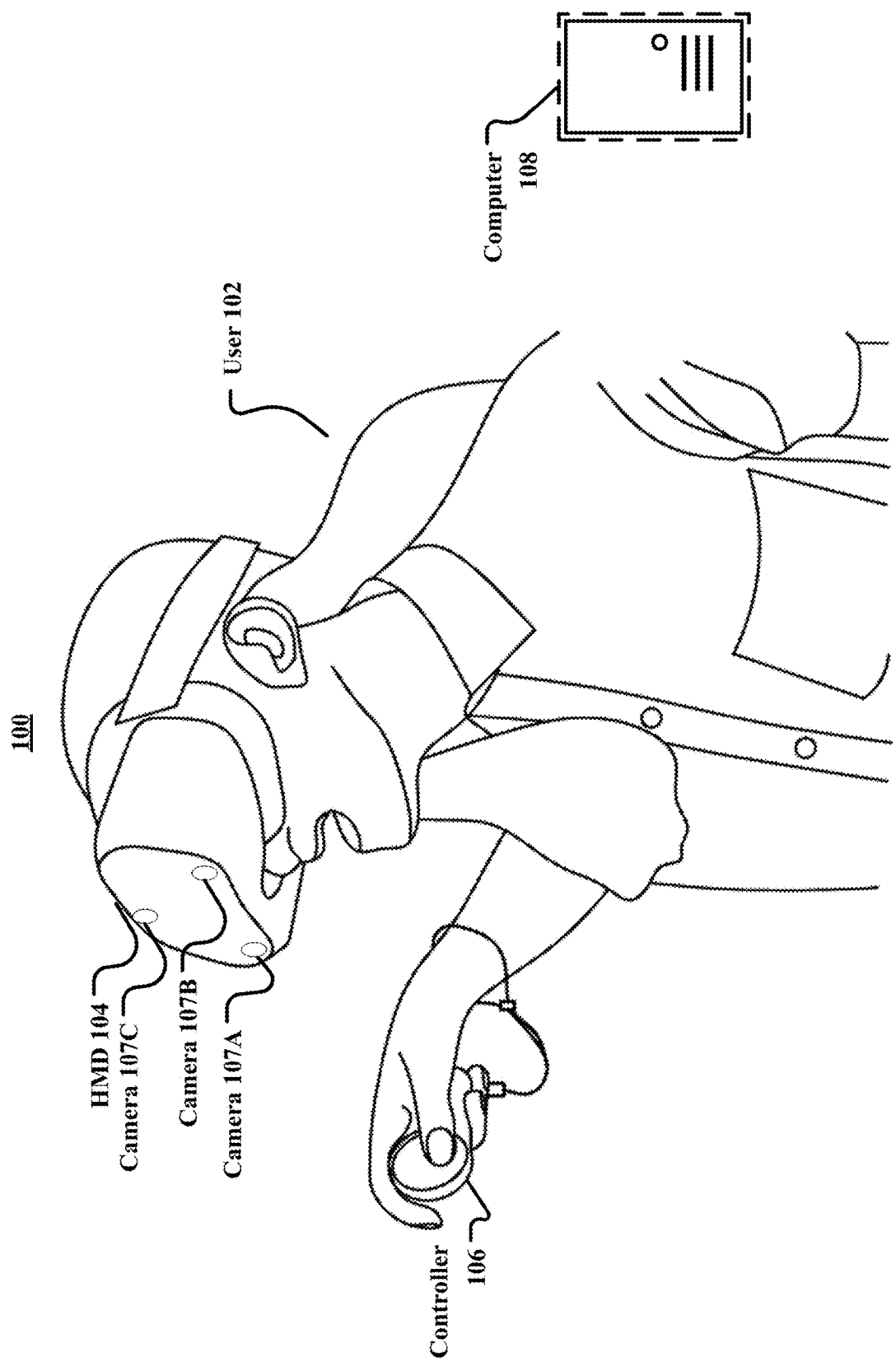
FIG. 1A illustrates an example artificial reality system worn by a user, in accordance with particular embodiments.

"Passthrough" is a feature that allows a user wearing an HMD to see his physical surroundings by displaying visual information captured by the HMD's front-facing cameras. To account for misalignment between the stereo cameras and the user's eyes and to provide parallax, the passthrough images are re-rendered based on a 3D model representation of the physical surrounding. The 3D model provides the rendering system geometry information, and the images captured by the HMD's cameras are used as texture images.

In particular embodiments, a computing system may generate monochrome images and color images from an image sensor that has sparse RGB sensor pattern. Current designs of artificial reality (e.g., AR/VR) devices may include image sensors (e.g., cameras) with only monochrome pixel sensors to enable features such as, headset tracking, depth detection, monochrome passthrough, and the like. However, to improve upon the user experience, a user may desire color passthrough to enable the user to see images that more closely resemble the real world. The cost of replacing current image sensors that have monochrome pixel sensors with color pixel sensors may be cost-prohibitive. Current algorithms may also rely on certain inputs, such as data received from monochrome pixel sensors. Additionally, the quantum efficiency of the color pixel sensors may be less than panchromatic pixel sensors that are similar to monochrome pixel sensors. As a result, to enable color passthrough and maintain a certain threshold of quantum efficiency an image sensor may implement a filter including a sparse RGB pattern that may be implemented within global shutter sensors. The sparse RGB pattern may enable color information extraction from the global shutter cameras.

In particular embodiments, the sparse RGB pattern may be designed into global shutter sensors. The sparse RGB pattern may be de-mosaiced in an image signal processor (ISP) of a computing system and the color information can be fed into a monochrome image to provide a color passthrough experience to the user. To do so, a sparse RGB CFA pattern may be used for an image sensor. In particular embodiments, the RGGB pattern implemented may account for a certain percentage (e.g., 25%) of the total pixel array and the rest of the can be panchromatic pixels. When generating the color image, one or more of the median value or mean values of surrounding pixel sensors may be used to color a pixel sensor. The gradient in brightness change may be used to determine a direction of which mean to use. As an example and not by way of limitation, if the color changes less frequently along a direction for instance a striped shirt, then the mean of that particular direction may be used to ensure a more accurate color reading. The ISP may use a particular algorithm to determine color values to apply to surrounding pixels of a color pixel sensor. In particular embodiments, the ISP may determine a delta value to carry over to the surrounding panchromatic pixel sensors by subtracting an interpolated white pixel from a filtered monochrome image to extract the color information to be added to a target interpolated white pixel. This process may be carried over to interpolate color information to the panchromatic pixel sensors. The result may be used for color passthrough to improve upon the user experience.

In particular embodiments, a computing system may receive sensor data from an image sensor. In particular embodiments, the computing system may be embodied as one or more of a smartphone, artificial reality device (e.g., AR/VR device), camera device, and the like. While this disclosure describes the computing system performing one or more functions, this disclosure contemplates one or more functions being performed by an ISP of the computing system. In particular embodiments, the image sensor may have a pixel array comprising color pixel sensors and panchromatic pixel sensors in a first pattern. Each of the color pixel sensors may be associated with one of a plurality of color channels. As an example and not by way of limitation, each of the color pixel sensors may be associated with a red channel, a green channel, or a blue channel. In particular embodiments, the color pixel sensors comprises a first percentage of pixel sensors of the pixel array of the image sensor and the panchromatic pixel sensors comprises a second percentage of the pixel sensors of the pixel array of the image sensor. In particular embodiments, the first percentage is less than the second percentage. As an example and not by way of limitation, the first percentage may be 25% and the second percentage may be 75%. In particular embodiments, the image sensor may be embodied as one or more of a global shutter camera or a rolling shutter camera. In particular embodiments, the image sensor may be an external-facing camera attached to an artificial reality device. While this disclosure describes an image sensor, this disclosure contemplates a plurality of image sensors to capture sensor data. As an example and not by way of limitation, the computing system may include at least two image sensors to capture a left image and a right image to generate stereoscopic images to be presented to a user of the computing system. Although this disclosure describes receiving sensor data from an image sensor in a particular manner, this disclosure contemplates receiving sensor data from an image sensor in any suitable manner.

In particular embodiments, the computing system may generate a filtered monochrome image. In particular embodiments, the computing system may generate the filtered monochrome image based on the sensor data received from the image sensor of the computing system. The filtereated monochrome image may comprise one or more monochrome values corresponding to the pixel array of the image sensor. In particular embodiments, the computing system may analyze a plurality of panchromatic pixel sensors of the panchromatic pixel sensors surrounding a color pixel sensor of the color pixel sensors. In particular embodiments, the computing system may select a subset of the plurality of panchromatic pixel sensors. As an example and not by way of limitation, the computing system may determine one or more gradients associated with the monochrome values of the plurality of panchromatic pixel sensors. The computing system may identify a first subset of the plurality of panchromatic pixel sensors that intersect the pixel vertically or a second subset of the plurality of panchromatic pixel sensors that intersect the pixel horizontally, based on the one or more gradients. In particular embodiments, the computing system may determine a mean monochrome value based on the monochrome values of the subset of the plurality of panchromatic pixel sensors. In particular embodiments, the computing system may associate the mean monochrome value with a third pixel location associated with the color pixel sensor. In particular embodiments, the computing system may perform one or more of headset tracking, controller tracking, or depth sensing based on the filtered monochrome image. Although this disclosure describes generating a filtered monochrome image in a particular manner, this disclosure contemplates generating a filtered monochrome image in any suitable manner.

In particular embodiments, the computing system may generate a filtered color image. In particular embodiments, the filtered color image may have a second pattern of color channels. In particular embodiments, a first pixel of a particular color channel at a first pixel location in the filtered color image may be determined based on the monochrome value corresponding to the first pixel location in the filtered monochrome image, the sensor data measured by one of the color pixel sensors at a second pixel location that is associated with the particular color channel, and the monochrome value at the second pixel location in the filtered monochrome image. In particular embodiments, the computing system may identify a color of a color pixel sensor to be interpolated to a panchromatic pixel sensor. In particular embodiments, the computing system may identify one or more pixel locations associated with the panchromatic pixel sensors to receive the color of the color pixel sensor based on the color of the color pixel sensor. As an example and not by way of limitation, each color may have a different mapping scheme as described herein. In particular embodiments, the computing system may subtract a monochrome value associated with a third pixel location of the color pixel sensor to extract a color value of the color pixel sensor. In particular embodiments, the computing system may interpolate the color value to the one or more pixel locations associated with the panchromatic pixel sensors by adding the color value to the monochrome value of the respective one or more pixel locations associated with the panchromatic pixel sensors. In particular embodiments, the computing system may present the filtered color image via one or more displays of the computing system. In particular embodiments, the computing system may generate a pair of filtered color images corresponding to a left image sensor and a right image sensor to generate a pair of stereoscopic images to present to the user. As an example and not by way of limitation, a user wearing an artificial reality device may be presented two color stereoscopic images to displays of the artificial reality device. Although this disclosure describes generating a filtered color image in a particular manner, this disclosure contemplates generating a filtered color image in any suitable manner.

FIG. 1A illustrates an example of an artificial reality system 100 worn by a user 102. In particular embodiments, the artificial reality system 100 may comprise a head-mounted device ("HMD") 104, a controller 106, and a computing system 108. The HMD 104 may be worn over the user's eyes and provide visual content to the user 102 through internal displays (not shown). The HMD 104 may have two separate internal displays, one for each eye of the user 102. As illustrated in FIG. 1A, the HMD 104 may completely cover the user's field of view. By being the exclusive provider of visual information to the user 102, the HMD 104 achieves the goal of providing an immersive artificial-reality experience. One consequence of this, however, is that the user 102 would not be able to see the physical environment surrounding him, as his vision is shielded by the HMD 104. As such, the passthrough feature described herein is needed to provide the user with real-time visual information about his physical surroundings. The HMD 104 may comprise several image sensors 107A-107C that may be embodied as external-facing cameras 107A-107C. In particular embodiments, cameras 107A-107C may be an image sensor with a sparse RGB pattern as described herein.

Figure 1B:
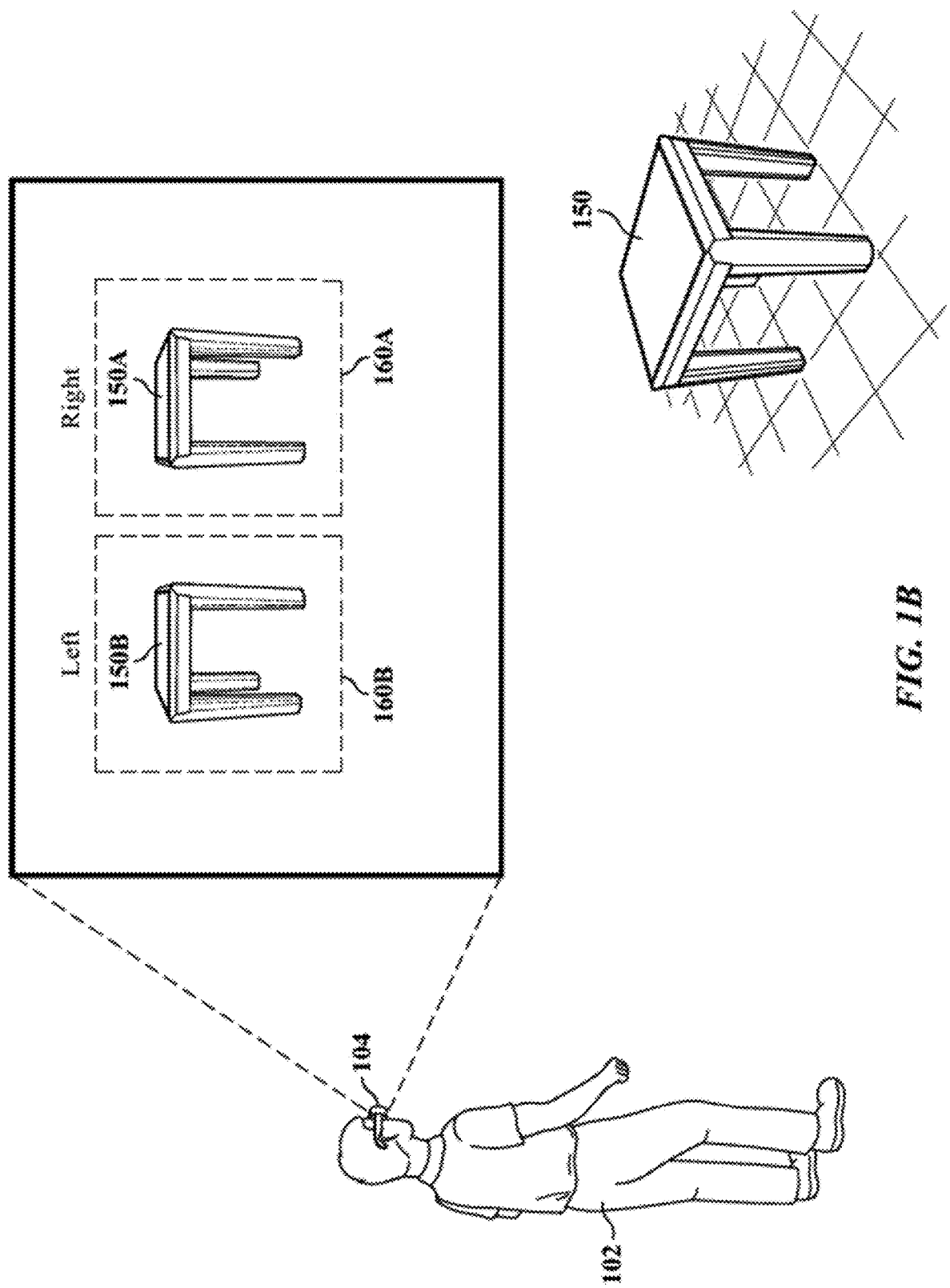
FIG. 1B illustrates an example of a passthrough feature, in accordance with particular embodiments.

FIG. 1B illustrates an example of the passthrough feature. A user 102 may be wearing an HMD 104, immersed within a virtual reality environment. A physical table 150 is in the physical environment surrounding the user 102. However, due to the HMD 104 blocking the vision of the user 102, the user 102 is unable to see the table 150 directly. To help the user perceive his physical surroundings while wearing the HMD 104, the passthrough feature captures information about the physical environment using, for example, the aforementioned external-facing cameras 107A-107C. While the HMD 104 has three external-facing cameras 107A-107C, any combination of the cameras 107A-107C may be used to perform the functions as described herein. As an example and not by way of limitation, cameras 107A-107B may be used to perform one or more functions as described herein. The captured information may then be re-projected to the user 102 based on his viewpoints. In particular embodiments where the HMD 104 has a right display 160A for the user's right eye and a left display 160B for the user's left eye, the system 100 may individually render (1) a re-projected view 150A of the physical environment for the right display 160A based on a viewpoint of the user's right eye and (2) a re-projected view 150B of the physical environment for the left display 160B based on a viewpoint of the user's left eye.

Referring again to FIG. 1A, the HMD 104 may have external-facing cameras, such as the three forward-facing cameras 107A-107C shown in FIG. 1A. While only three forward-facing cameras 107A-C are shown, the HMD 104 may have any number of cameras facing any direction (e.g., an upward-facing camera to capture the ceiling or room lighting, a downward-facing camera to capture a portion of the user's face and/or body, a backward-facing camera to capture a portion of what's behind the user, and/or an internal camera for capturing the user's eye gaze for eye-tracking purposes). The external-facing cameras are configured to capture the physical environment around the user and may do so continuously to generate a sequence of frames (e.g., as a video). As previously explained, although images captured by the forward-facing cameras 107A-C may be directly displayed to the user 102 via the HMD 104, doing so would not provide the user with an accurate view of the physical environment since the cameras 107A-C cannot physically be located at the exact same location as the user's eyes. As such, the passthrough feature described herein uses a re-projection technique that generates a 3D representation of the physical environment and then renders images based on the 3D representation from the viewpoints of the user's eyes.

The 3D representation may be generated based on depth measurements of physical objects observed by the cameras 107A-107C. Depth may be measured in a variety of ways. In particular embodiments, depth may be computed based on stereo images. For example, the three forward-facing cameras 107A-C may share an overlapping field of view and be configured to capture images simultaneously. As a result, the same physical object may be captured by the cameras 107A-C at the same time. For example, a particular feature of an object may appear at one pixel PA in the image captured by camera 107A, and the same feature may appear at another pixel pB in the image captured by camera 107B. As long as the depth measurement system knows that the two pixels correspond to the same feature, it could use triangulation techniques to compute the depth of the observed feature. For example, based on the camera 107A's position within a 3D space and the pixel location of PA relative to the camera 107A's field of view, a line could be projected from the camera 107A and through the pixel PA. A similar line could be projected from the other camera 107B and through the pixel pB. Since both pixels are supposed to correspond to the same physical feature, the two lines should intersect. The two intersecting lines and an imaginary line drawn between the two cameras 107A and 107B form a triangle, which could be used to compute the distance of the observed feature from either camera 107A or 107B or a point in space where the observed feature is located. The same can be done between either of cameras 107A-107B and camera 107C.

In particular embodiments, the pose (e.g., position and orientation) of the HMD 104 within the environment may be needed. For example, in order to render the appropriate display for the user 102 while he is moving about in a virtual environment, the system 100 would need to determine his position and orientation at any moment. Based on the pose of the HMD, the system 100 may further determine the viewpoint of either of the cameras 107A-107C or either of the user's eyes. In particular embodiments, the HMD 104 may be equipped with inertial-measurement units ("IMU"). The data generated by the IMU, along with the stereo imagery captured by the external-facing cameras 107A-107B, allow the system 100 to compute the pose of the HMD 104 using, for example, SLAM (simultaneous localization and mapping) or other suitable techniques.

In particular embodiments, the artificial reality system 100 may further have one or more controllers 106 that enable the user 102 to provide inputs. The controller 106 may communicate with the HMD 104 or a separate computing unit 108 via a wireless or wired connection. The controller 106 may have any number of buttons or other mechanical input mechanisms. In addition, the controller 106 may have an IMU so that the position of the controller 106 may be tracked. The controller 106 may further be tracked based on predetermined patterns on the controller. For example, the controller 106 may have several infrared LEDs or other known observable features that collectively form a predetermined pattern. Using a sensor or camera, the system 100 may be able to capture an image of the predetermined pattern on the controller. Based on the observed orientation of those patterns, the system may compute the controller's position and orientation relative to the sensor or camera.

The artificial reality system 100 may further include a computer unit 108. The computer unit may be a stand-alone unit that is physically separate from the HMD 104, or it may be integrated with the HMD 104. In embodiments where the computer 108 is a separate unit, it may be communicatively coupled to the HMD 104 via a wireless or wired link. The computer 108 may be a high-performance device, such as a desktop or laptop, or a resource-limited device, such as a mobile phone. A high-performance device may have a dedicated GPU and a high-capacity or constant power source. A resource-limited device, on the other hand, may not have a GPU and may have limited battery capacity. As such, the algorithms that could be practically used by an artificial reality system 100 depends on the capabilities of its computer unit 108.

In embodiments where the computing unit 108 is a high-performance device, an embodiment of the passthrough feature may be designed as follows. Through the external-facing cameras 107A-107C of the HMD 104, a sequence of images of the surrounding physical environment may be captured. The information captured by the cameras 107A-107C, however, would be misaligned with what the user's eyes would capture since the cameras could not spatially coincide with the user's eyes (e.g., the cameras would be located some distance away from the user's eyes and, consequently, have different viewpoints). As such, simply displaying what the cameras captured to the user would not be an accurate representation of what the user should perceive.

Instead of simply displaying what was captured, the passthrough feature would re-project information captured by the external-facing cameras 107A-107C to the user. Each pair of simultaneously captured stereo images may be used to estimate the depths of observed features. As explained above, to measure depth using triangulation, the computing unit 108 would need to find correspondences between the stereo images. For example, the computing unit 108 would determine which two pixels in the pair of stereo images correspond to the same observed feature. A high-performance computing unit 108 may solve the correspondence problem using its GPU and optical flow techniques, which are optimized for such tasks. The correspondence information may then be used to compute depths using triangulation techniques. Based on the computed depths of the observed features, the computing unit 108 could determine where those features are located within a 3D space (since the computing unit 108 also knows where the cameras are in that 3D space). The result may be represented by a dense 3D point cloud, with each point corresponding to an observed feature. The dense point cloud may then be used to generate 3D models of objects in the environment. When the system renders a scene for display, the system could perform visibility tests from the perspectives of the user's eyes. For example, the system may cast rays into the 3D space from a viewpoint that corresponds to each eye of the user. In this manner, the rendered scene that is displayed to the user would be computed from the perspective of the user's eyes, rather than from the perspective of the external-facing cameras 107A-107C.

The process described above, however, may not be feasible for a resource-limited computing unit (e.g., a mobile phone may be the main computational unit for the HMD). For example, unlike systems with powerful computational resources and ample energy sources, a mobile phone cannot rely on GPUs and computationally-expensive algorithms (e.g., optical flow) to perform depth measurements and generate an accurate 3D model of the environment. Thus, to provide passthrough on resource-limited devices, an optimized process is needed.

In particular embodiments, the computing system may be configured to dynamically determine, at runtime, whether it is capable of or able to generate depth measurements using (1) the GPU and optical flow or (2) the optimized technique using video encoder and motion vectors. For example, if the device has a GPU and sufficient power budget (e.g., it is plugged into a power source, has a full battery, etc.), it may perform depth measurements using its GPU and optical flow. However, if the device does not have a GPU or has a stringent power budget, then it may opt for the optimized method for computing depths.

In particular embodiments, the computing system may comprise an ISP to perform one or more functions as described herein. As an example and not by way of limitation, the computing system may use the ISP to generate a filtered monochrome image and a filtered color image.

Figure 2:
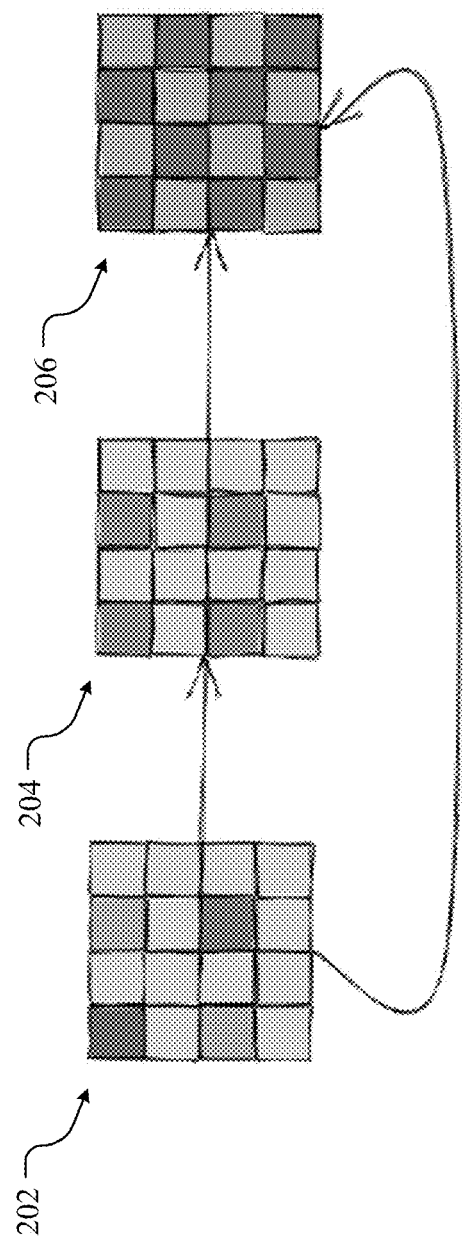
FIG. 2 illustrates a process of generating a monochrome pattern and a RGGB pattern, in accordance with particular embodiments.

FIG. 2 illustrates a process 200 of generating a monochrome pattern and a RGGB pattern, in accordance with particular embodiments. The process 200 may start with an image sensor receiving sensor data. The image sensor may have a pixel array that includes color pixel sensors and panchromatic pixel sensors. In particular embodiments, the image sensor may have a sparse RGB pattern 202. In particular embodiments, the image sensor may receive sensor data that may not be in a format that can be used for functions such as headset tracking, controller tracking, or depth sensing. As such, the computing system may process the received data from the image sensor to generate a filtered monochrome image 204 and a filtered color image 206 (e.g., a RGGB patterned image). In particular embodiments, the computing system may use an ISP to initially extract a filtered monochrome image 204 from the received sensor data from the image sensor with the RGB pattern 202. The computing system may use the sensor data from the image sensor and the filtered monochrome image 204 to generate the filtered color image 206.

Figure 3:
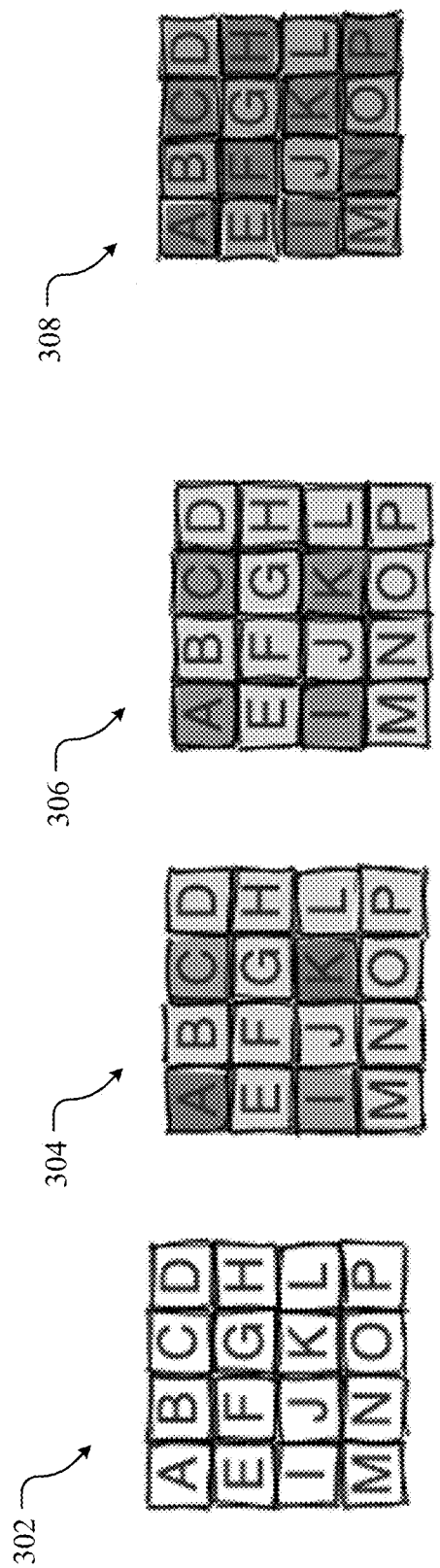
FIG. 3 illustrates example pixel configurations and images, in accordance with particular embodiments.

FIG. 3 illustrates example pixel configurations 302-304 and images 306-308, in accordance with particular embodiments. The pixel array of the image sensor of the computing system may be labeled similarly to pixel configuration 302. In particular embodiments, the pixel configuration 304 may be similar to the sparse RGB pattern 202, the image 306 may be similar to image 204, and the image 308 may be similar to image 206. In particular embodiments, the pixel array of the image sensor may comprise a RGB pattern similar to pixel configuration 304. In particular embodiments, the RGB pattern in pixel configuration 304 may include a red pixel labeled A, two green pixels labeled C and I, and one blue pixel labeled K. The rest of the pixels labeled B, D, E, F, G, H, J, L, M, N, O, and P may be monochrome pixel sensors or panchromatic pixel sensors. In particular embodiments, the computing system may generate a filtered monochrome image 306 based on the data received from an image sensor using the pixel configuration 304. The computing system may use a sparse median filter to interpolate monochrome values to the color pixel sensors labeled A, C, I, and K in the pixel configuration 302. The computing system may analyze the surrounding panchromatic pixel sensors and their respective monochrome values to interpolate monochrome values to the pixel locations of the color pixel sensors labeled A, C, I, and K. In particular embodiments, the computing system may generate a filtered color image 308 based on the received sensor data from an image sensor using the pixel configuration 304 and the filtered monochrome image 306. In particular embodiments, the computing system may interpolate color information received from the color pixel sensors A, C, I, and K of the image sensor using the pixel configuration 304 to target pixel locations of the panchromatic pixel sensors of pixel configuration 304 (e.g., the gray pixel locations). In particular embodiments, the filtered color image 308 may comprise red pixels labeled A, C, I, and K, green pixels labeled B, D, E, G, J, L, M, and O, and blue pixels labeled F, H, N, and P. While a certain configuration of pixel sensors are shown, this disclosure contemplates other configurations of pixel sensors to generate images 306-308 or other kind of images.

Figure 4:
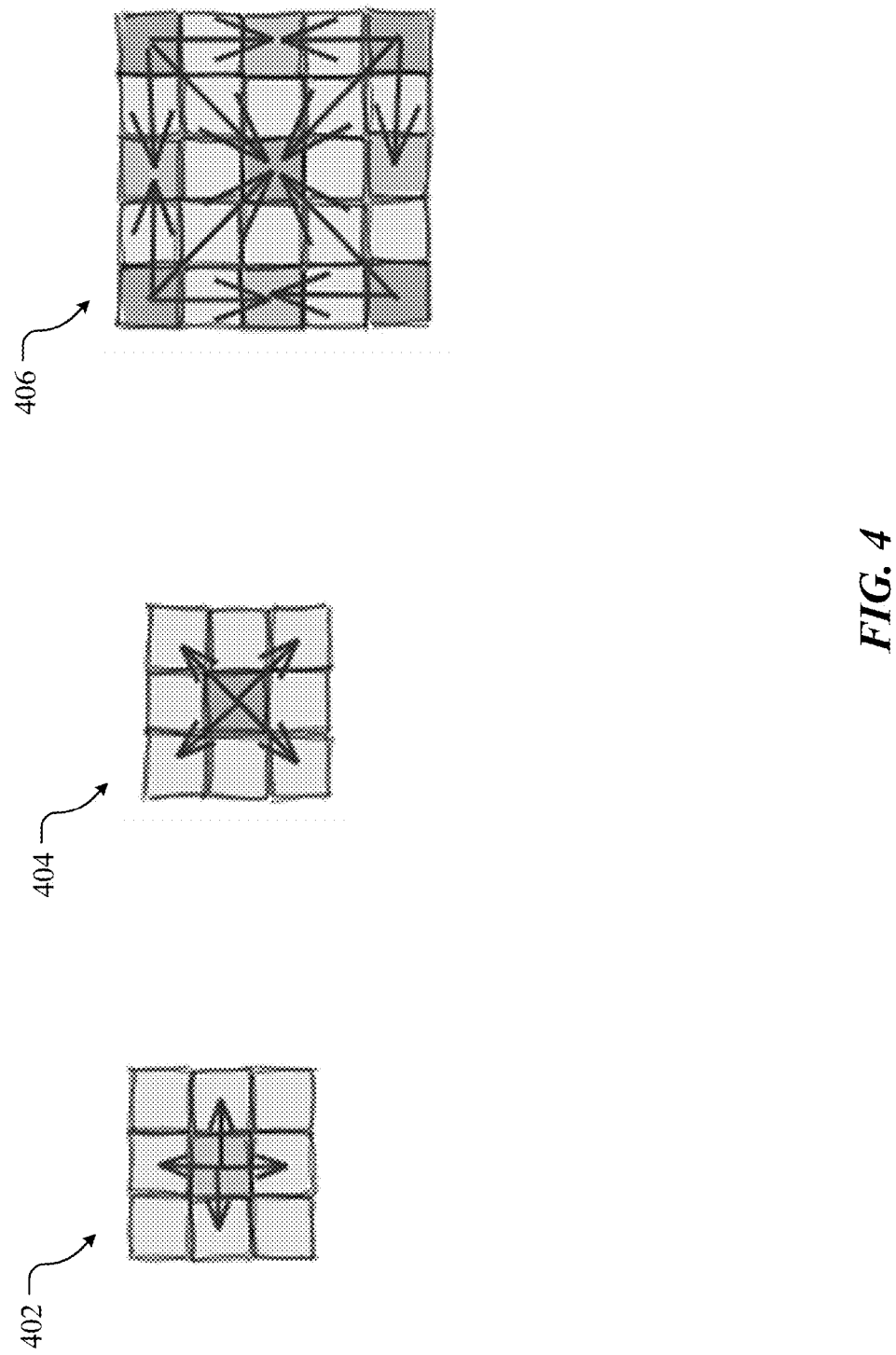
FIG. 4 illustrates example pixel sensor mappings based on color channel, in accordance with particular embodiments.

In particular embodiments, the mapping to determine color interpolation is based on the mappings 402-406 shown in FIG. 4. In particular embodiments, a green mapping 402 indicates that a green color pixel sensor will interpolate the green color information to pixel locations directly to its immediate 4×4 neighborhood. In particular embodiments, a blue mapping 404 indicates that a blue color pixel sensor will interpolate the blue color information to pixel locations directly to its diagonal 4×4 neighborhood. In particular embodiments, a red mapping 406 indicates that a red color pixel sensor will either leave the red color information untouched or are mapped from 2 or 4 skip-neighboring pixels to interpolate the red color information. Although, a segment of the entire pixel array of the image sensor is shown, this pixel configuration 304 may repeat a plurality of times to cover the entire pixel array.

Figure 5:
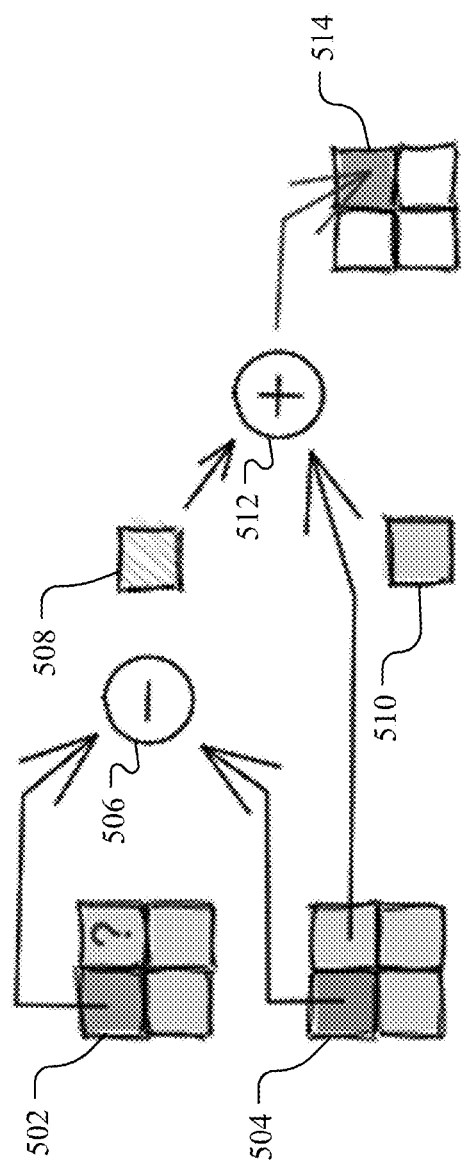
FIG. 5 illustrates an example process of interpolating color information to a target pixel location, in accordance with particular embodiments.

FIG. 5 illustrates an example process 500 of interpolating color information to a target pixel location, in accordance with particular embodiments. In particular embodiments, the computing system may perform the process 500. As an example and not by way of limitation, the computing system may use an ISP to perform the process 500. While this process 500 illustrates a process of interpolating green color information from one pixel location (e.g., green pixel location 502) to a target pixel location, this process 500 contemplates interpolating either red or blue color information from one pixel location to a target pixel location based on the mappings 402-406. In particular embodiments, the process 500 may begin with the received sensor data corresponding to a pixel location 502 and a monochrome value 504 associated with the same pixel location 502. The monochrome value 504 may be interpolated based on the process described herein. As an example and not by way of limitation, the computing system may use an ISP and a sparse median filter to determine a monochrome value to associate with a pixel location 502. In particular embodiments, the process 500 may perform a subtraction operation 506 between the monochrome value 504 and the received sensor data corresponding to the pixel location 502 to extract the color information 508. The process 500 may continue by accessing the monochrome value 510 associated with the target pixel location and perform an addition operation 512 to add the color information 508 to the monochrome value 510 of the target pixel location to interpolate the color information to generate a filtered color pixel 514.

Figure 6A:
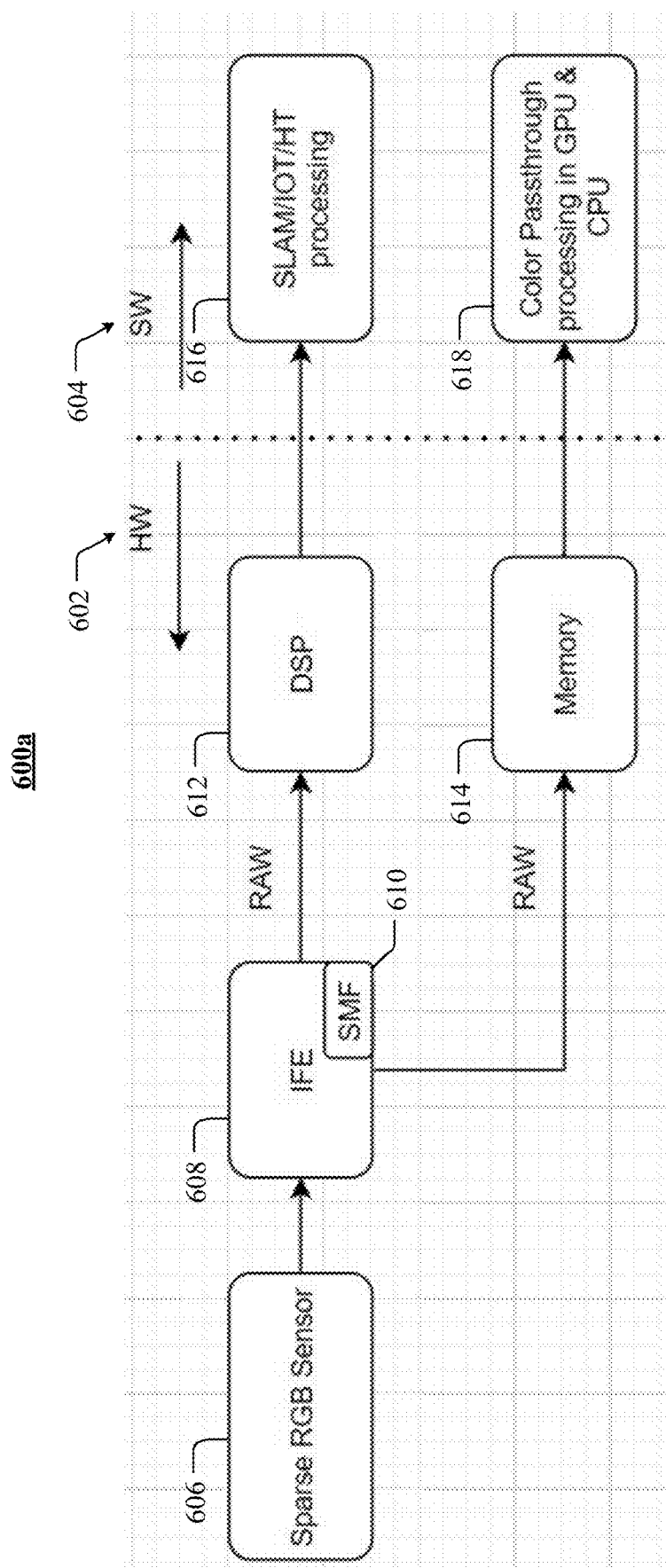
FIGS. 6A-6C illustrate example configurations of a pipeline to process sensor data from a sparse RGB sensor, in accordance with particular embodiments.
Figure 6B:
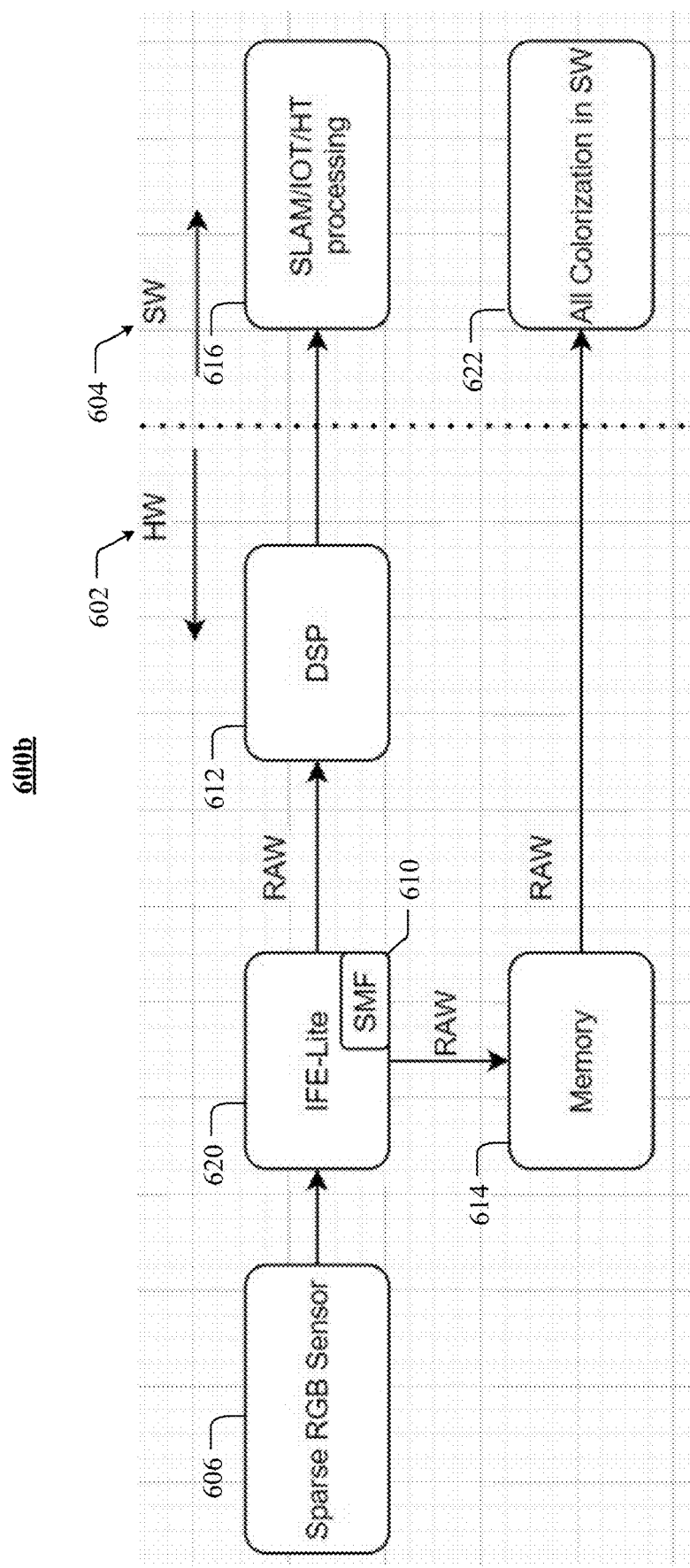
Figure 6C:
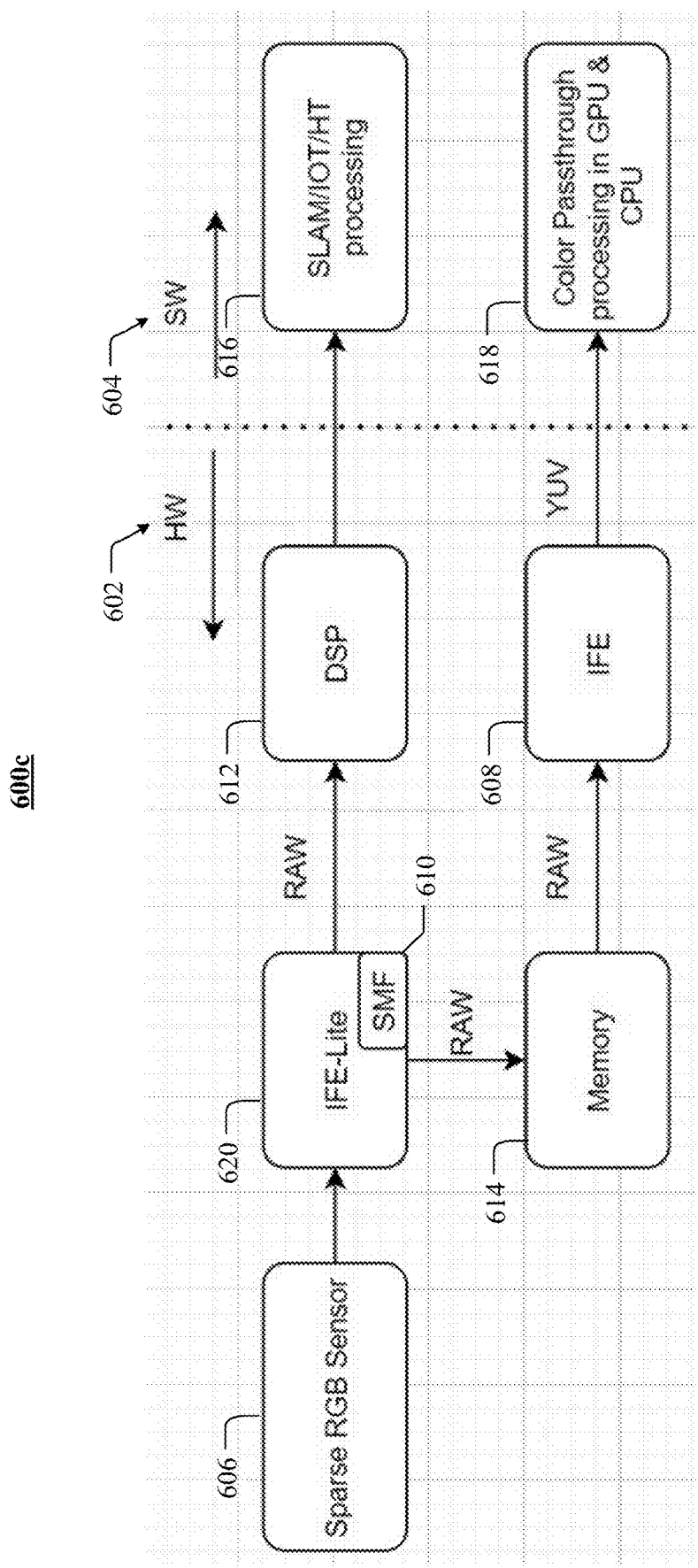

FIGS. 6A-6C illustrate example configurations 600a-600c of a pipeline to process sensor data from a sparse RGB sensor, in accordance with particular embodiments. In particular embodiments, a computing system (e.g., an artificial reality system) may implement the example configurations 600a-600c to process sensor data. Referring to FIG. 6A, an example configuration 600a is shown. In particular embodiments, the example configuration may comprise a hardware component 602 of the pipeline to process sensor data and a software component 604 to process the sensor data. The hardware 602 may include one or more of a sparse RGB sensor 606 (e.g., an image sensor with a RGB pattern described herein), an image front end (IFE) 608 with a sparse median filter (SMF) component 610, digital signal processor (DSP) 612, and memory 614. The software may include one or more of SLAM/IOT/HT processing component 616 and color passthrough processing in GPU and/or CPU component 618. In particular embodiments, the computing system implementing the configuration 600a may perform de-mosaicing, gamma correction, color conversion, and the like completely in the hardware 602. In particular embodiments, the hardware 602 may generate a filtered monochrome image and a filtered color image to pass to the components 616-618. In particular embodiments, the computing system may use the component 616 to perform one or more of SLAM, IOT, or HT based on the filtered monochrome image. In particular embodiments, the computing system may use component 618 to perform color passthrough processing in GPU and/or CPU to generate stereoscopic images from the filtered color image. As an example and not by way of limitation, the computing system may generate two filtered color images corresponding to a left image sensor and a right image sensor to generate stereoscopic images to be presented to a user to perform color passthrough.

Referring to FIG. 6B, an example configuration 600b is shown. In particular embodiments, the example configuration 600b may comprise a hardware component 602 of the pipeline to process sensor data and a software component 604 to process the sensor data. The hardware 602 may include one or more of a sparse RGB sensor 606 (e.g., an image sensor with a RGB pattern described herein), an image front end-lite (IFE-lite) 620 with a sparse median filter (SMF) component 610, digital signal processor (DSP) 612, and memory 614. The software may include one or more of SLAM/IOT/HT processing component 616 and all colorization component 622. In particular embodiments, the computing system implementing configuration 600b may process the sensor stream from the sparse RGB sensor 606 as monochrome in the hardware 602 and then the data may be piped into the software component 604 where the data can be sparse-CFA binned and demosaiced to extract color pixel information. The color pixel information can be combined with panchromatic pixel information to generate the filtered color image. The filtered color image may be processed to generate stereoscopic images as described herein. The SMF 610 may track RGGB pixels and replace them with values interpolated from neighboring panchromatic pixels as described herein. In particular embodiments, the SMF 610 may implement a 2-D algorithm that uses a median filter approach to perform a rank ordering of kernel pixels. For each pixel, the algorithm may identify a 3×3 ROI of adjacent panchromatic pixels and calculate an estimate of the pixel value if it were a panchromatic pixel. The SMF 610 may then select the two middle rank pixel values and calculate their average as a replacement value for the center pixel. In particular embodiments, an average of all adjacent panchromatic pixels may be used. In particular embodiments, the SMF 610 may analyze the panchromatic values to determine a gradient of the panchromatic values. The SMF 610 may determine a direction (e.g., up/down or left/right) in which the gradient is smaller to use the corresponding panchromatic values to generate an average as a replacement value for the center pixel. In particular embodiments, the configuration 600b may enable simultaneous passthrough on separate image sensors based on available components of the computing system.

Referring to FIG. 6C, an example configuration 600c is shown. In particular embodiments, the example configuration 600b may comprise a hardware component 602 of the pipeline to process sensor data and a software component 604 to process the sensor data. The hardware 602 may include one or more of a sparse RGB sensor 606 (e.g., an image sensor with a RGB pattern described herein), an image front end-lite (IFE-lite) 620 with a sparse median filter (SMF) component 610, digital signal processor (DSP) 612, memory 614, and IFE 608. The software may include one or more of SLAM/IOT/HT processing component 616 and color passthrough processing in GPU and/or CPU component 618.

In particular embodiments, while not shown, the computing system may include an IR filter to remove IR pollution within the filtered color image. The pixel array may receive noise (e.g., IR pollution) in addition to the sensor data corresponding to desired sensor data. The computing system may use one or more filters to remove the noise. In particular embodiments, the computing system may implement a machine-learning model to remove the noise associated with the received sensor data. In particular embodiments, the machine-learning model may be trained with inputs including the filtered color image generated from the ISP pipeline and a ground truth image to remove noise associated with the received sensor data, such as IR pollution.

Figure 7:
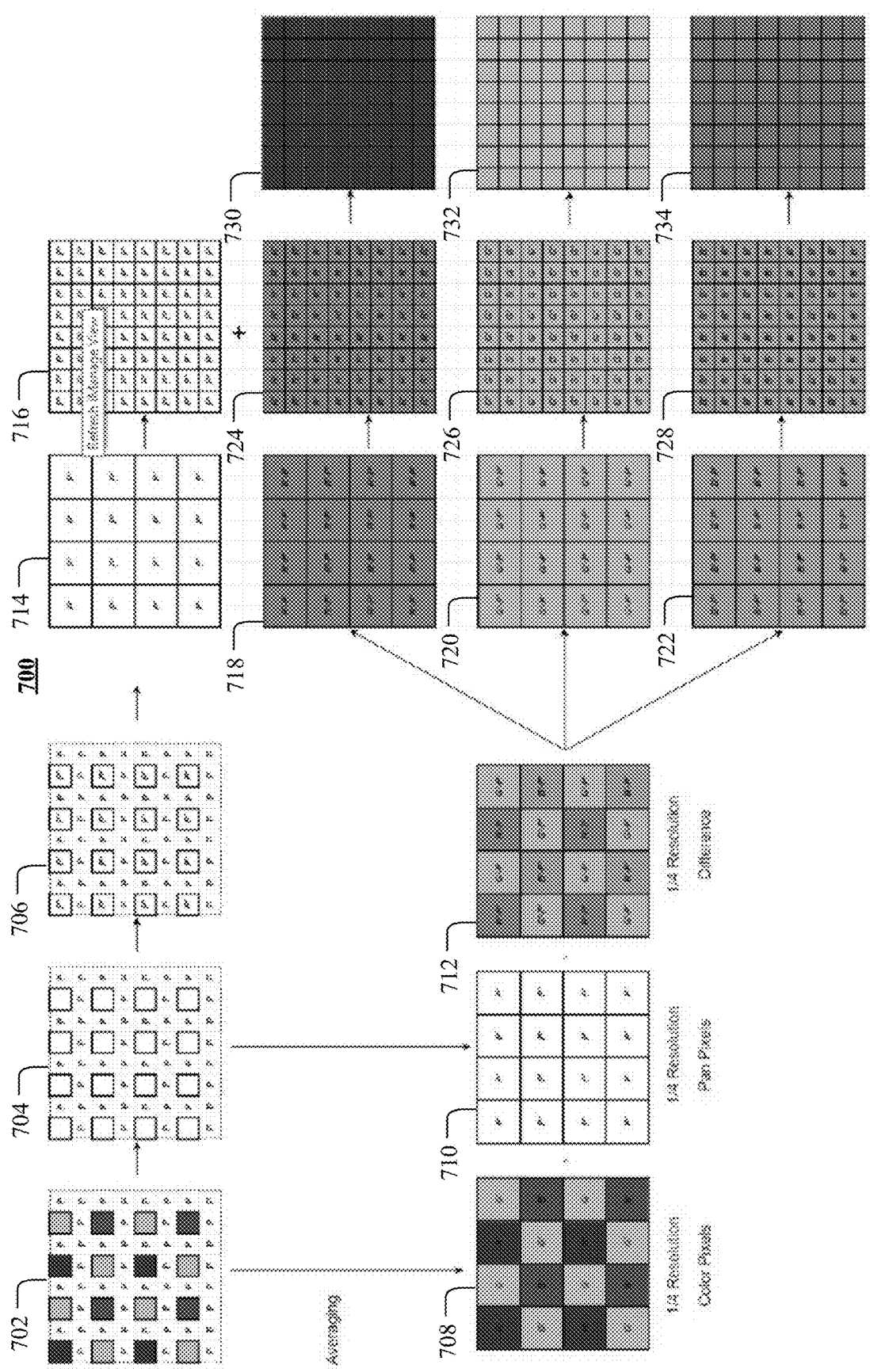
FIG. 7 illustrates an example process for generating a filtered color image, in accordance with particular embodiments.

FIG. 7 illustrates an example process 700 for generating a filtered color image, in accordance with particular embodiments. The process 700 may start with received sensor data 702 from an image sensor with a sparse RGB pattern as described herein. In particular embodiments, the sparse RGB pattern may be duplicated across a whole array to receive the sensor data 702. The process 700 may remove the pixel values associated with the color pixel sensors to generate a panchromatic pixel sensor values 704. In particular embodiments, the process 700 may interpolate panchromatic values to the pixel locations of the color pixel sensors to generate a filtered monochrome image 706 (or filtered panchromatic image) as described herein. While this disclosure may refer to a filtered monochrome image, this disclosure contemplates processing or generating a panchromatic pixel image in a similar manner. As an example and not by way of limitation, the monochrome pixel sensors may be replaced by panchromatic pixel sensors to generate filtered panchromatic images similarly to a filtered monochrome image. In particular embodiments, the process 700 may average out the sensor data corresponding to the color pixel sensors to generate a filtered color image 708 at ¼ the resolution of the original sensor data. As an example and not by way of limitation, the intensity values of the surrounding panchromatic pixels may be used to average out the color information based on the sensor data of the color pixel sensor. In particular embodiments, the filtered color image 708 may include RGB values as shown by the labeled R', G', and B'. In particular embodiments, the process 700 may average out the sensor data corresponding to the panchromatic pixel sensors to generate a filtered panchromatic image 710 at ¼ the resolution of the original sensor data. In particular embodiments, the process 700 may combine the filtered color image 708 at ¼ resolution and the filtered panchromatic image 710 at ¼ resolution to generate a difference 712 at ¼ resolution. The filtered monochrome image 706 may be averaged out to generate a filtered panchromatic image 714 at ¼ resolution. The filtered panchromatic image 714 at ¼ resolution may be upscaled to generate a filtered panchromatic image 716. In particular embodiments, the process 700 may perform a delayering process using the difference 712 at ¼ resolution to generate red pixel color information 718 at ¼ resolution, green pixel color information 720 at ¼ resolution, and blue pixel color information 722 at ¼ resolution. The color information 718, 720, 722 may be upscaled to generate red pixel color information 724, green pixel color information 726, and blue pixel color information 728. Each of the color information 722, 724, 728 may be combined with the filtered panchromatic image 716 that includes the panchromatic values to generate a final red color information 730, a final green color information 732, and a final blue color information 734. The final color informations 730, 732, 734 may be used to perform color passthrough. As an example and not by way of limitation, the final color informations 730, 732, 734 can correspond to a left image sensor which may be combined the a similar output from a right image sensor to generate a pair of stereoscopic images to present to the user via an artificial reality system.

Figure 8:
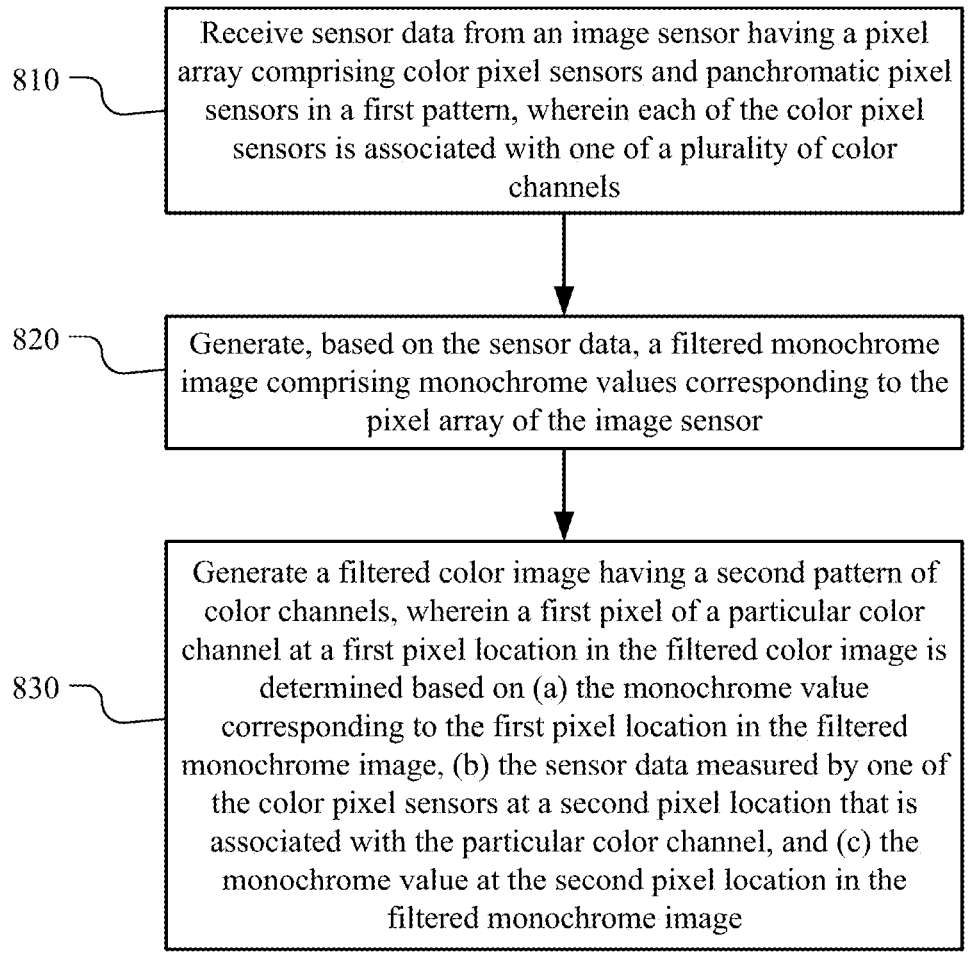
FIG. 8 illustrates an example method for generating a filtered color image, in accordance with particular embodiments.

FIG. 8 illustrates an example method 800 for generating a filtered color image. The method may begin at step 810, where a computing system may receive sensor data from an image sensor having a pixel array comprising color pixel sensors and panchromatic pixel sensors in a first pattern. In particular embodiments, each of the color pixel sensors may be associated with one of a plurality of color channels. In particular embodiments, the computing system may be embodied as an artificial reality system. In particular embodiments, the computing system may use an ISP to perform one or more steps of the method 800. At step 820, the computing system may generate, based on the sensor data, a filtered monochrome image comprising monochrome values corresponding to the pixel array of the image sensor. At step 830, the computing system may generate a filtered color image having a second pattern of color channels. In particular embodiments, a first pixel of a particular color channel at a first pixel location in the filtered color image is determined based on (a) the monochrome value corresponding to the first pixel location in the filtered monochrome image, (b) the sensor data measured by one of the color pixel sensors at a second pixel location that is associated with the particular color channel, and (c) the monochrome value at the second pixel location in the filtered monochrome image.

Particular embodiments may repeat one or more steps of the method of FIG. 8, where appropriate. Although this disclosure describes and illustrates particular steps of the method of FIG. 8 as occurring in a particular order, this disclosure contemplates any suitable steps of the method of FIG. 8 occurring in any suitable order. Moreover, although this disclosure describes and illustrates an example method for generating a filtered color image, including the particular steps of the method of FIG. 8, this disclosure contemplates any suitable method for generating a filtered color image, including any suitable steps, which may include a subset of the steps of the method of FIG. 8, where appropriate. Furthermore, although this disclosure describes and illustrates particular components, devices, or systems carrying out particular steps of the method of FIG. 8, this disclosure contemplates any suitable combination of any suitable components, devices, or systems carrying out any suitable steps of the method of FIG. 8.

Figure 9:
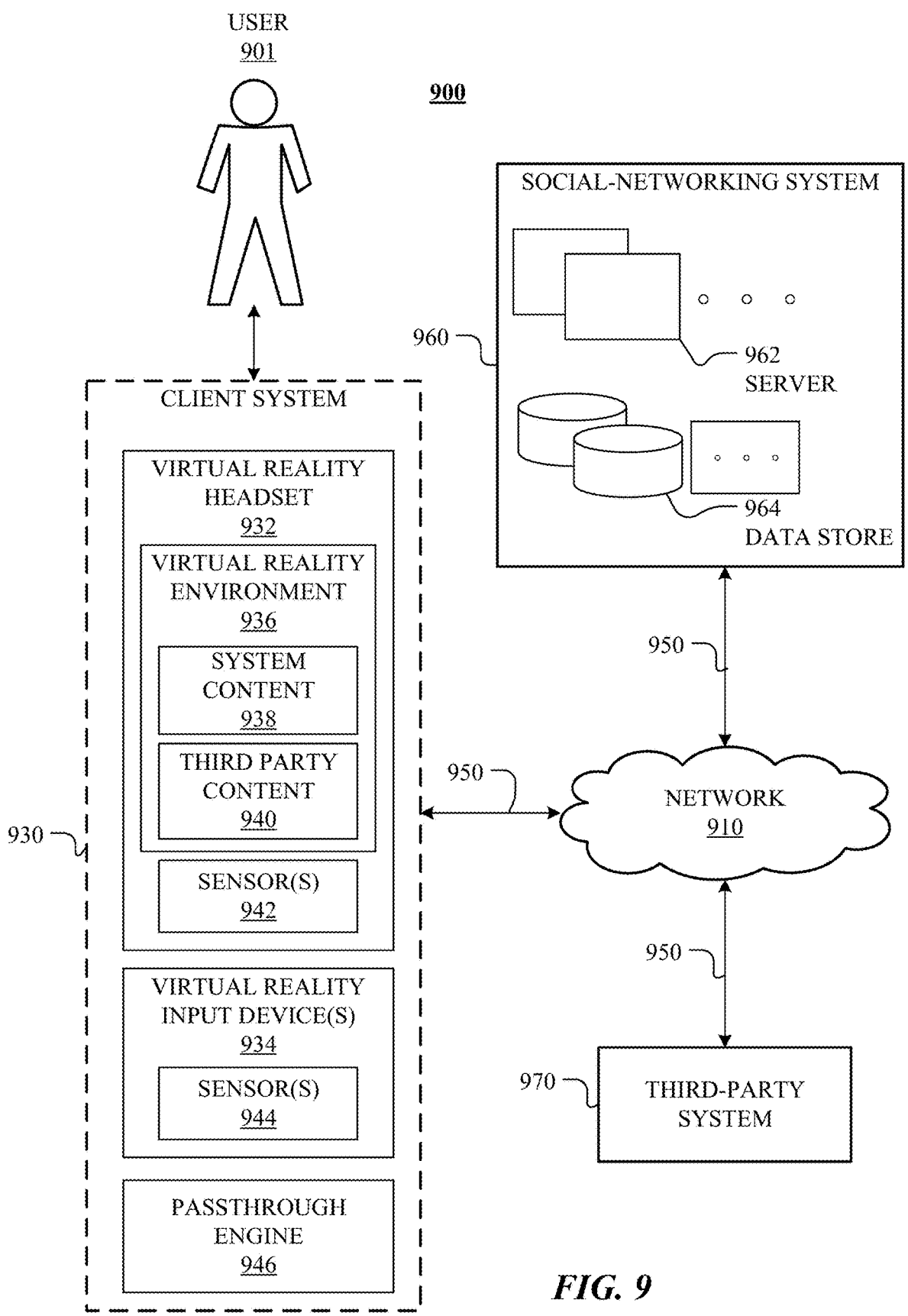
FIG. 9 illustrates an example network environment associated with a VR or social-networking system.

FIG. 9 illustrates an example network environment 900 associated with a virtual reality system. Network environment 900 includes a user 901 interacting with a client system 930, a social-networking system 960, and a third-party system 970 connected to each other by a network 910. Although FIG. 9 illustrates a particular arrangement of a user 901, a client system 930, a social-networking system 960, a third-party system 970, and a network 910, this disclosure contemplates any suitable arrangement of a user 901, a client system 930, a social-networking system 960, a third-party system 970, and a network 910. As an example and not by way of limitation, two or more of a user 901, a client system 930, a social-networking system 960, and a third-party system 970 may be connected to each other directly, bypassing a network 910. As another example, two or more of a client system 930, a social-networking system 960, and a third-party system 970 may be physically or logically co-located with each other in whole or in part. Moreover, although FIG. 9 illustrates a particular number of users 901, client systems 930, social-networking systems 960, third-party systems 970, and networks 910, this disclosure contemplates any suitable number of client systems 930, social-networking systems 960, third-party systems 970, and networks 910. As an example and not by way of limitation, network environment 900 may include multiple users 901, client systems 930, social-networking systems 960, third-party systems 970, and networks 910.

This disclosure contemplates any suitable network 910. As an example and not by way of limitation, one or more portions of a network 910 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 910 may include one or more networks 910.

Links 950 may connect a client system 930, a social-networking system 960, and a third-party system 970 to a communication network 910 or to each other. This disclosure contemplates any suitable links 950. In particular embodiments, one or more links 950 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 950 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 950, or a combination of two or more such links 950. Links 950 need not necessarily be the same throughout a network environment 900. One or more first links 950 may differ in one or more respects from one or more second links 950.

In particular embodiments, a client system 930 may be an electronic device including hardware, software, or embedded logic components or a combination of two or more such components and capable of carrying out the appropriate functionalities implemented or supported by a client system 930. As an example and not by way of limitation, a client system 930 may include a computer system such as a desktop computer, notebook or laptop computer, netbook, a tablet computer, e-book reader, GPS device, camera, personal digital assistant (PDA), handheld electronic device, cellular telephone, smartphone, virtual reality headset and controllers, other suitable electronic device, or any suitable combination thereof. This disclosure contemplates any suitable client systems 930. A client system 930 may enable a network user at a client system 930 to access a network 910. A client system 930 may enable its user to communicate with other users at other client systems 930. A client system 930 may generate a virtual reality environment for a user to interact with content.

In particular embodiments, a client system 930 may include a virtual reality (or augmented reality) headset 932, such as OCULUS RIFT and the like, and virtual reality input device(s) 934, such as a virtual reality controller. A user at a client system 930 may wear the virtual reality headset 932 and use the virtual reality input device(s) to interact with a virtual reality environment 936 generated by the virtual reality headset 932. Although not shown, a client system 930 may also include a separate processing computer and/or any other component of a virtual reality system. A virtual reality headset 932 may generate a virtual reality environment 936, which may include system content 938 (including but not limited to the operating system), such as software or firmware updates and also include third-party content 940, such as content from applications or dynamically downloaded from the Internet (e.g., web page content). A virtual reality headset 932 may include sensor(s) 942, such as accelerometers, gyroscopes, magnetometers to generate sensor data that tracks the location of the headset device 932. The headset 932 may also include eye trackers for tracking the position of the user's eyes or their viewing directions. The client system may use data from the sensor(s) 942 to determine velocity, orientation, and gravitation forces with respect to the headset. Virtual reality input device(s) 934 may include sensor(s) 944, such as accelerometers, gyroscopes, magnetometers, and touch sensors to generate sensor data that tracks the location of the input device 934 and the positions of the user's fingers. The client system 930 may make use of outside-in tracking, in which a tracking camera (not shown) is placed external to the virtual reality headset 932 and within the line of sight of the virtual reality headset 932. In outside-in tracking, the tracking camera may track the location of the virtual reality headset 932 (e.g., by tracking one or more infrared LED markers on the virtual reality headset 932). Alternatively or additionally, the client system 930 may make use of inside-out tracking, in which a tracking camera (not shown) may be placed on or within the virtual reality headset 932 itself. In inside-out tracking, the tracking camera may capture images around it in the real world and may use the changing perspectives of the real world to determine its own position in space.

In particular embodiments, client system 930 (e.g., an HMD) may include a passthrough engine 946 to provide the passthrough feature described herein, and may have one or more add-ons, plug-ins, or other extensions. A user at client system 930 may connect to a particular server (such as server 962, or a server associated with a third-party system 970). The server may accept the request and communicate with the client system 930.

Third-party content 940 may include a web browser, such as MICROSOFT INTERNET EXPLORER, GOOGLE CHROME or MOZILLA FIREFOX, and may have one or more add-ons, plug-ins, or other extensions, such as TOOL-BAR or YAHOO TOOLBAR. A user at a client system 930 may enter a Uniform Resource Locator (URL) or other address directing a web browser to a particular server (such as server 962, or a server associated with a third-party system 970), and the web browser may generate a Hyper Text Transfer Protocol (HTTP) request and communicate the HTTP request to server. The server may accept the HTTP request and communicate to a client system 930 one or more Hyper Text Markup Language (HTML) files responsive to the HTTP request. The client system 930 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web interface encompasses one or more corresponding source files (which a browser may use to render the web interface) and vice versa, where appropriate.

In particular embodiments, the social-networking system 960 may be a network-addressable computing system that can host an online social network. The social-networking system 960 may generate, store, receive, and send social-networking data, such as, for example, user-profile data, concept-profile data, social-graph information, or other suitable data related to the online social network. The social-networking system 960 may be accessed by the other components of network environment 900 either directly or via a network 910. As an example and not by way of limitation, a client system 930 may access the social-networking system 960 using a web browser of a third-party content 940, or a native application associated with the social-networking system 960 (e.g., a mobile social-networking application, a messaging application, another suitable application, or any combination thereof) either directly or via a network 910. In particular embodiments, the social-networking system 960 may include one or more servers 962. Each server 962 may be a unitary server or a distributed server spanning multiple computers or multiple datacenters. Servers 962 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 962 may include hardware, software, or embedded logic components or a combination of two or more such components for carrying out the appropriate functionalities implemented or supported by server 962. In particular embodiments, the social-networking system 960 may include one or more data stores 964. Data stores 964 may be used to store various types of information. In particular embodiments, the information stored in data stores 964 may be organized according to specific data structures. In particular embodiments, each data store 964 may be a relational, columnar, correlation, or other suitable database. Although this disclosure describes or illustrates particular types of databases, this disclosure contemplates any suitable types of databases. Particular embodiments may provide interfaces that enable a client system 930, a social-networking system 960, or a third-party system 970 to manage, retrieve, modify, add, or delete, the information stored in data store 964.

In particular embodiments, the social-networking system 960 may store one or more social graphs in one or more data stores 964. In particular embodiments, a social graph may include multiple nodes—which may include multiple user nodes (each corresponding to a particular user) or multiple concept nodes (each corresponding to a particular concept)—and multiple edges connecting the nodes. The social-networking system 960 may provide users of the online social network the ability to communicate and interact with other users. In particular embodiments, users may join the online social network via the social-networking system 960 and then add connections (e.g., relationships) to a number of other users of the social-networking system 960 whom they want to be connected to. Herein, the term "friend" may refer to any other user of the social-networking system 960 with whom a user has formed a connection, association, or relationship via the social-networking system 960.

In particular embodiments, the social-networking system 960 may provide users with the ability to take actions on various types of items or objects, supported by the social-networking system 960. As an example and not by way of limitation, the items and objects may include groups or social networks to which users of the social-networking system 960 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 960 or by an external system of a third-party system 970, which is separate from the social-networking system 960 and coupled to the social-networking system 960 via a network 910.

In particular embodiments, the social-networking system 960 may be capable of linking a variety of entities. As an example and not by way of limitation, the social-networking system 960 may enable users to interact with each other as well as receive content from third-party systems 970 or other entities, or to allow users to interact with these entities through an application programming interfaces (API) or other communication channels.

In particular embodiments, a third-party system 970 may include one or more types of servers, one or more data stores, one or more interfaces, including but not limited to APIs, one or more web services, one or more content sources, one or more networks, or any other suitable components, e.g., that servers may communicate with. A third-party system 970 may be operated by a different entity from an entity operating the social-networking system 960. In particular embodiments, however, the social-networking system 960 and third-party systems 970 may operate in conjunction with each other to provide social-networking services to users of the social-networking system 960 or third-party systems 970. In this sense, the social-networking system 960 may provide a platform, or backbone, which other systems, such as third-party systems 970, may use to provide social-networking services and functionality to users across the Internet.

In particular embodiments, a third-party system 970 may include a third-party content object provider. A third-party content object provider may include one or more sources of content objects, which may be communicated to a client system 930. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 960 also includes user-generated content objects, which may enhance a user's interactions with the social-networking system 960. User-generated content may include anything a user can add, upload, send, or "post" to the social-networking system 960. As an example and not by way of limitation, a user communicates posts to the social-networking system 960 from a client system 930. Posts may include data such as status updates or other textual data, location information, photos, videos, links, music or other similar data or media. Content may also be added to the social-networking system 960 by a third-party through a "communication channel," such as a newsfeed or stream.

In particular embodiments, the social-networking system 960 may include a variety of servers, sub-systems, programs, modules, logs, and data stores. In particular embodiments, the social-networking system 960 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 960 may also include suitable components such as network interfaces, security mechanisms, load balancers, failover servers, management-and-network-operations consoles, other suitable components, or any suitable combination thereof. In particular embodiments, the social-networking system 960 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 960 to one or more client systems 930 or one or more third-party systems 970 via a network 910. The web server may include a mail server or other messaging functionality for receiving and routing messages between the social-networking system 960 and one or more client systems 930. An API-request server may allow a third-party system 970 to access information from the social-networking system 960 by calling one or more APIs. An action logger may be used to receive communications from a web server about a user's actions on or off the social-networking system 960. In conjunction with the action log, a third-party-content-object log may be maintained of user exposures to third-party-content objects. A notification controller may provide information regarding content objects to a client system 930. Information may be pushed to a client system 930 as notifications, or information may be pulled from a client system 930 responsive to a request received from a client system 930. Authorization servers may be used to enforce one or more privacy settings of the users of the social-networking system 960. A privacy setting of a user determines how particular information associated with a user can be shared. The authorization server may allow users to opt in to or opt out of having their actions logged by the social-networking system 960 or shared with other systems (e.g., a third-party system 970), such as, for example, by setting appropriate privacy settings. Third-party-content-object stores may be used to store content objects received from third parties, such as a third-party system 970. Location stores may be used for storing location information received from client systems 930 associated with users. Advertisement-pricing modules may combine social information, the current time, location information, or other suitable information to provide relevant advertisements, in the form of notifications, to a user.

Figure 10:
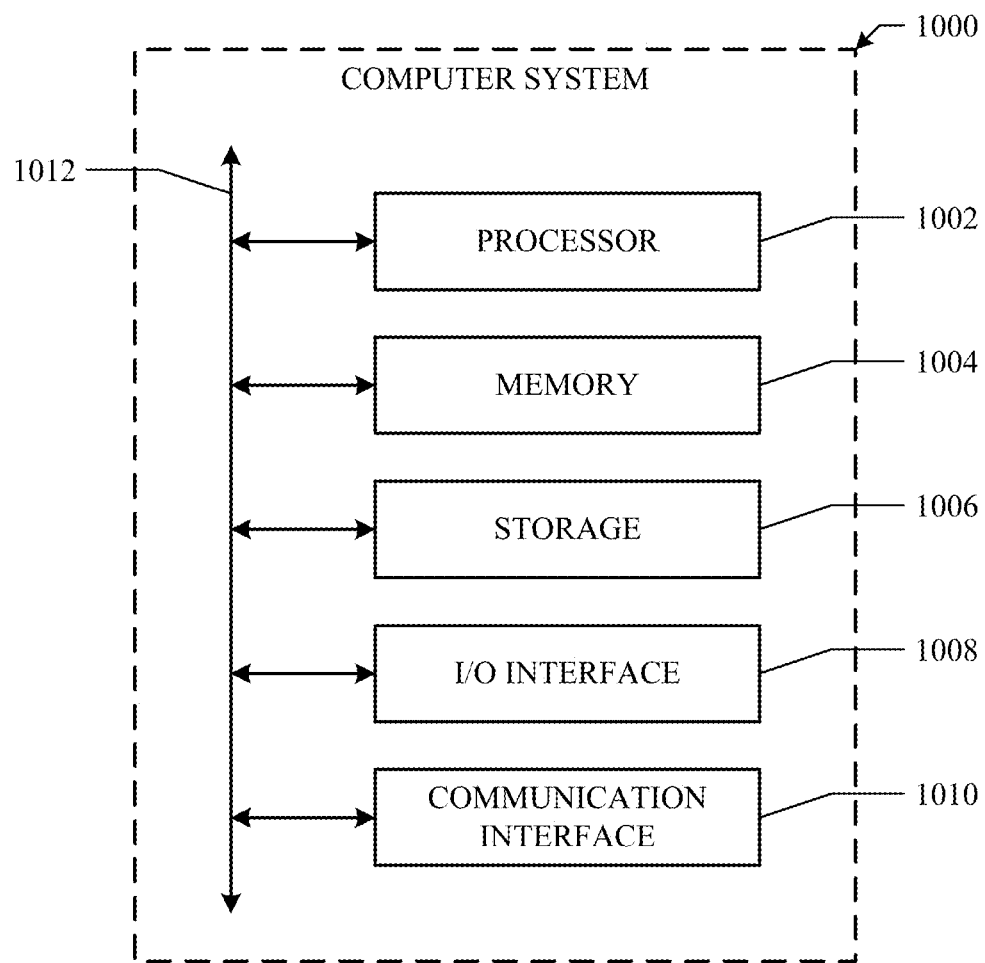
FIG. 10 illustrates an example computer system.

FIG. 10 illustrates an example computer system 1000. In particular embodiments, one or more computer systems 1000 perform one or more steps of one or more methods described or illustrated herein. In particular embodiments, one or more computer systems 1000 provide functionality described or illustrated herein. In particular embodiments, software running on one or more computer systems 1000 performs one or more steps of one or more methods described or illustrated herein or provides functionality described or illustrated herein. Particular embodiments include one or more portions of one or more computer systems 1000. Herein, reference to a computer system may encompass a computing device, and vice versa, where appropriate. Moreover, reference to a computer system may encompass one or more computer systems, where appropriate.

This disclosure contemplates any suitable number of computer systems 1000. This disclosure contemplates computer system 1000 taking any suitable physical form. As example and not by way of limitation, computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1000 may include one or more computer systems 1000; be unitary or distributed; span multiple locations; span multiple machines; span multiple data centers; or reside in a cloud, which may include one or more cloud components in one or more networks. Where appropriate, one or more computer systems 1000 may perform without substantial spatial or temporal limitation one or more steps of one or more methods described or illustrated herein. As an example and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1002, memory 1004, storage 1006, an input/output (I/O) interface 1008, a communication interface 1010, and a bus 1012. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. This disclosure contemplates processor 1002 including any suitable number of any suitable internal caches, where appropriate. As an example and not by way of limitation, processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002. Data in the data caches may be copies of data in memory 1004 or storage 1006 for instructions executing at processor 1002 to operate on; the results of previous instructions executed at processor 1002 for access by subsequent instructions executing at processor 1002 or for writing to memory 1004 or storage 1006; or other suitable data. The data caches may speed up read or write operations by processor 1002. The TLBs may speed up virtual-address translation for processor 1002. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs); be a multi-core processor; or include one or more processors 1002. Although this disclosure describes and illustrates a particular processor, this disclosure contemplates any suitable processor.

In particular embodiments, memory 1004 includes main memory for storing instructions for processor 1002 to execute or data for processor 1002 to operate on. As an example and not by way of limitation, computer system 1000 may load instructions from storage 1006 or another source (such as, for example, another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere). One or more memory buses (which may each include an address bus and a data bus) may couple processor 1002 to memory 1004. Bus 1012 may include one or more memory buses, as described below. In particular embodiments, one or more memory management units (MMUs) reside between processor 1002 and memory 1004 and facilitate accesses to memory 1004 requested by processor 1002. In particular embodiments, memory 1004 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memories 1004, where appropriate. Although this disclosure describes and illustrates particular memory, this disclosure contemplates any suitable memory.

In particular embodiments, storage 1006 includes mass storage for data or instructions. As an example and not by way of limitation, storage 1006 may include a hard disk drive (HDD), a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. In particular embodiments, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006. Although this disclosure describes and illustrates particular storage, this disclosure contemplates any suitable storage.

In particular embodiments, I/O interface 1008 includes hardware, software, or both, providing one or more interfaces for communication between computer system 1000 and one or more I/O devices. Computer system 1000 may include one or more of these I/O devices, where appropriate. One or more of these I/O devices may enable communication between a person and computer system 1000. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1008 for them. Where appropriate, I/O interface 1008 may include one or more device or software drivers enabling processor 1002 to drive one or more of these I/O devices. I/O interface 1008 may include one or more I/O interfaces 1008, where appropriate. Although this disclosure describes and illustrates a particular I/O interface, this disclosure contemplates any suitable I/O interface.

In particular embodiments, communication interface 1010 includes hardware, software, or both providing one or more interfaces for communication (such as, for example, packet-based communication) between computer system 1000 and one or more other computer systems 1000 or one or more networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1010 for it. As an example and not by way of limitation, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

In particular embodiments, bus 1012 includes hardware, software, or both coupling components of computer system 1000 to each other. As an example and not by way of limitation, bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1012 may include one or more buses1012, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
   receiving sensor data from an image sensor having a pixel array comprising color pixel sensors and panchromatic pixel sensors in a first pattern, wherein each of the color pixel sensors is associated with one of a plurality of color channels;
   generating, based on the sensor data, a filtered monochrome image comprising monochrome values corresponding to the pixel array of the image sensor; and
   generating a filtered color image having a second pattern of color channels, wherein a first pixel of a particular color channel at a first pixel location in the filtered color image is determined based on (a) the monochrome value corresponding to the first pixel location in the filtered monochrome image, (b) the sensor data measured by one of the color pixel sensors at a second pixel location that is associated with the particular color channel, and (c) the monochrome value at the second pixel location in the filtered monochrome image.

2. The method of claim 1, wherein the color pixel sensors comprises a first percentage of pixel sensors of the pixel array of the image sensor and the panchromatic pixel sensors comprises a second percentage of the pixel sensors of the pixel array of the image sensor, wherein the first percentage is less than the second percentage.

3. The method of claim 1, further comprising:
   performing one or more of headset tracking, controller tracking, or depth sensing based on the filtered monochrome image.

4. The method of claim 1, further comprising:
   presenting the filtered color image via one or more displays of the computing system.

5. The method of claim 1, wherein the image sensor comprises a global shutter camera.

6. The method of claim 1, wherein generating the filtered monochrome image comprises, for each pixel sensor of the color pixel sensors:
   analyzing a plurality of panchromatic pixel sensors of the panchromatic pixel sensors surrounding a color pixel sensor of the color pixel sensors;
   selecting a subset of the plurality of panchromatic pixel sensors;
   determining a mean monochrome value based on the monochrome values of the subset of the plurality of panchromatic pixel sensors; and
   associating the mean monochrome value with a third pixel location associated with the color pixel sensor.

7. The method of claim 6, wherein selecting the subset of the plurality of panchromatic pixel sensors comprises:

determining one or more gradients associated with the monochrome values of the plurality of panchromatic pixel sensors; and
   identifying a first subset of the plurality of panchromatic pixel sensors that intersect the pixel vertically or a second subset of the plurality of panchromatic pixel sensors that intersect the pixel horizontally, based on the one or more gradients.

8. The method of claim 1, wherein generating the filtered color image comprises, for each pixel sensor of the panchromatic pixel sensors:
   identifying a color of a color pixel sensor to be interpolated to a panchromatic pixel sensor;
   identifying one or more pixel locations associated with the panchromatic pixel sensors to receive the color of the color pixel sensor based on the color of the color pixel sensor;
   subtracting a monochrome value associated with a third pixel location of the color pixel sensor to extract a color value of the color pixel sensor; and
   interpolating the color value to the one or more pixel locations associated with the panchromatic pixel sensors by adding the color value to the monochrome value of the respective one or more pixel locations associated with the panchromatic pixel sensors.

9. One or more computer-readable non-transitory storage media embodying software that is operable when executed to, by a computing system:
   receive sensor data from an image sensor having a pixel array comprising color pixel sensors and panchromatic pixel sensors in a first pattern, wherein each of the color pixel sensors is associated with one of a plurality of color channels;
   generate, based on the sensor data, a filtered monochrome image comprising monochrome values corresponding to the pixel array of the image sensor; and
   generate a filtered color image having a second pattern of color channels, wherein a first pixel of a particular color channel at a first pixel location in the filtered color image is determined based on (a) the monochrome value corresponding to the first pixel location in the filtered monochrome image, (b) the sensor data measured by one of the color pixel sensors at a second pixel location that is associated with the particular color channel, and (c) the monochrome value at the second pixel location in the filtered monochrome image.

10. The media of claim 9, wherein the color pixel sensors comprises a first percentage of pixel sensors of the pixel array of the image sensor and the panchromatic pixel sensors comprises a second percentage of the pixel sensors of the pixel array of the image sensor, wherein the first percentage is less than the second percentage.

11. The media of claim 9, wherein the one or more computer-readable non-transitory storage media is further operable when executed to:
   perform one or more of headset tracking, controller tracking, or depth sensing based on the filtered monochrome image.

12. The media of claim 9, wherein the one or more computer-readable non-transitory storage media is further operable when executed to:
   present the filtered color image via one or more displays of the computing system.

13. The media of claim 9, wherein the one or more computer-readable non-transitory storage media is further operable when executed to:

analyze a plurality of panchromatic pixel sensors of the panchromatic pixel sensors surrounding a color pixel sensor of the color pixel sensors;

select a subset of the plurality of panchromatic pixel sensors;

determine a mean monochrome value based on the monochrome values of the subset of the plurality of panchromatic pixel sensors; and associate the mean monochrome value with a third pixel location associated with the color pixel sensor.

14. The media of claim 9, wherein the one or more computer-readable non-transitory storage media is further operable when executed to:

identify a color of a color pixel sensor to be interpolated to a panchromatic pixel sensor;

identify one or more pixel locations associated with the panchromatic pixel sensors to receive the color of the color pixel sensor based on the color of the color pixel sensor;

subtract a monochrome value associated with a third pixel location of the color pixel sensor to extract a color value of the color pixel sensor; and interpolate the color value to the one or more pixel locations associated with the panchromatic pixel sensors by adding the color value to the monochrome value of the respective one or more pixel locations associated with the panchromatic pixel sensors.

15. A computing system comprising:

one or more processors; and one or more computer-readable non-transitory storage media coupled to one or more of the processors and comprising instructions operable when executed by one or more of the processors to cause the system to:

receive sensor data from an image sensor having a pixel array comprising color pixel sensors and panchromatic pixel sensors in a first pattern, wherein each of the color pixel sensors is associated with one of a plurality of color channels;

generate, based on the sensor data, a filtered monochrome image comprising monochrome values corresponding to the pixel array of the image sensor; and generate a filtered color image having a second pattern of color channels, wherein a first pixel of a particular color channel at a first pixel location in the filtered color image is determined based on (a) the monochrome value corresponding to the first pixel location in the filtered monochrome image, (b) the sensor data measured by one of the color pixel sensors at a second pixel location that is associated with the particular color channel, and (c) the monochrome value at the second pixel location in the filtered monochrome image.

16. The system of claim 15, wherein the color pixel sensors comprises a first percentage of pixel sensors of the pixel array of the image sensor and the panchromatic pixel sensors comprises a second percentage of the pixel sensors of the pixel array of the image sensor, wherein the first percentage is less than the second percentage.

17. The system of claim 15, wherein the one or more computer-readable non-transitory storage media is further operable when executed to:

perform one or more of headset tracking, controller tracking, or depth sensing based on the filtered monochrome image.

18. The system of claim 15, wherein the one or more computer-readable non-transitory storage media is further operable when executed to:

present the filtered color image via one or more displays of the computing system.

19. The system of claim 15, wherein the one or more computer-readable non-transitory storage media is further operable when executed to:

analyze a plurality of panchromatic pixel sensors of the panchromatic pixel sensors surrounding a color pixel sensor of the color pixel sensors;

select a subset of the plurality of panchromatic pixel sensors;

determine a mean monochrome value based on the monochrome values of the subset of the plurality of panchromatic pixel sensors; and associate the mean monochrome value with a third pixel location associated with the color pixel sensor.

20. The system of claim 15, wherein the one or more computer-readable non-transitory storage media is further operable when executed to:

identify a color of a color pixel sensor to be interpolated to a panchromatic pixel sensor;

identify one or more pixel locations associated with the panchromatic pixel sensors to receive the color of the color pixel sensor based on the color of the color pixel sensor;

subtract a monochrome value associated with a third pixel location of the color pixel sensor to extract a color value of the color pixel sensor; and interpolate the color value to the one or more pixel locations associated with the panchromatic pixel sensors by adding the color value to the monochrome value of the respective one or more pixel locations associated with the panchromatic pixel sensors.

* * * * *